United States Patent
Ahmed

(10) Patent No.: US 6,306,184 B2
(45) Date of Patent: Oct. 23, 2001

(54) DIESEL FUEL COMPOSITION

(75) Inventor: Irshad Ahmed, Plainsboro, NJ (US)

(73) Assignee: Pure Energy Corporation, New York, NY (US)

( * ) Notice: Subject to any disclaimer, the term of this patent is extended or adjusted under 35 U.S.C. 154(b) by 0 days.

(21) Appl. No.: 09/770,552

(22) Filed: Jan. 26, 2001

Related U.S. Application Data

(63) Continuation of application No. 09/547,210, filed on Apr. 11, 2000, now Pat. No. 6,190,427, which is a continuation of application No. 09/360,406, filed on Jul. 23, 1999, now abandoned, which is a continuation-in-part of application No. 09/197,711, filed on Nov. 23, 1998, now Pat. No. 6,017,369.

(51) Int. Cl.$^7$ ..................................................... C10L 1/18
(52) U.S. Cl. .................................................. 44/302; 44/301
(58) Field of Search ............................ 44/302, 301, 388, 44/418, 443

(56) References Cited

U.S. PATENT DOCUMENTS

| | | | |
|---|---|---|---|
| 3,876,391 | 4/1975 | McCoy et al. | 44/51 |
| 4,083,698 | 4/1978 | Wenzel et al. | 44/51 |
| 4,297,107 | 10/1981 | Boehmke | 44/51 |
| 4,451,265 | 5/1984 | Schwab | 44/51 |
| 4,477,258 | 10/1984 | Lepain | 44/51 |
| 4,565,548 | 1/1986 | Davis et al. | 44/51 |
| 4,568,354 | 2/1986 | Davis et al. | 44/51 |
| 4,744,796 | 5/1988 | Hazbun et al. | 44/51 |
| 5,104,418 | 4/1992 | Genova et al. | 44/302 |
| 5,746,785 | 5/1998 | Moulton et al. | 44/443 |
| 6,190,427 | * 2/2001 | Ahmed | 44/302 |

FOREIGN PATENT DOCUMENTS

| | | |
|---|---|---|
| 29 49 118 A1 | 5/1981 | (DE) . |
| 2217229A | 10/1989 | (GB) . |
| WO 98/17745 | 4/1998 | (WO) . |
| WO 99/20715 | 4/1999 | (WO) . |
| WO 99/52994 | 10/1999 | (WO) . |

OTHER PUBLICATIONS

Written Opinion in PCT/US99/27633 dated Aug. 25, 2000.

* cited by examiner

*Primary Examiner*—Jacqueline V. Howard
(74) *Attorney, Agent, or Firm*—Marshall, O'Toole, Gerstein, Murray & Borun

(57) ABSTRACT

A splash-blendable, solubilized diesel fuel composition includes a diesel fuel, ethanol, a stabilizing additive and, optionally, an alkyl ester of a fatty acid and/or a co-solvent. The stabilizing additive is either a mixture of fatty acid alcohols, a polymeric material, or a combination of the mixture and the polymeric material.

12 Claims, 1 Drawing Sheet

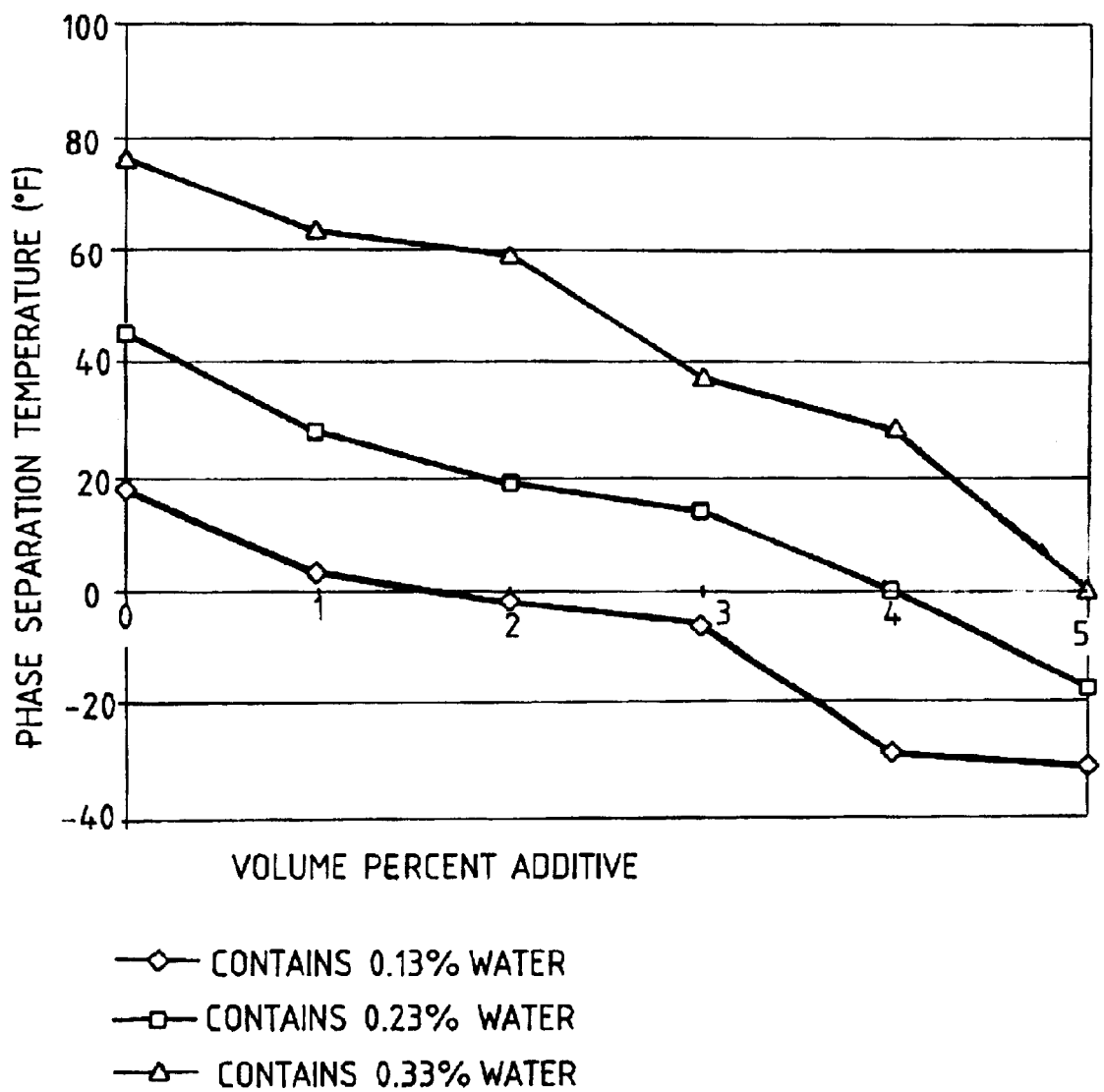

DIESEL FUEL COMPOSITION

This is a continuation of U.S. patent application Ser. No. 09/547,210 filed Apr. 11, 2000, now U.S. Pat. No. 6,190,427 issued Feb. 20, 2001, which is a continuation of U.S. patent application Ser. No. 09/360,406 filed Jul. 23, 1999, now abandoned which is a continuation-in-part of U.S. patent application Ser. No. 09/197,711 filed Nov. 23, 1998, now U.S. Pat. No. 6,017,369 issued Jan. 25, 2000.

BACKGROUND OF THE INVENTION

1. Field of the Invention

The invention relates to a diesel fuel composition for use in internal combustion engines.

2. Brief Description of Related Technology

Conventional diesel fuels are used throughout the United States and the world in internal combustion engines to power a wide variety of vehicles such as, for example, farm equipment, passenger cars, buses, trucks, and construction equipment. There are generally two conventional diesel fuels used in these types of vehicles, i.e., No. 1 diesel fuel and No. 2 diesel fuel. Conventional diesel fuels, however, are disfavored by both consumers and regulators because of the loud engine noise and harmful emissions (smoke) caused by the combustion of the fuel, and the hard starting in cold weather conditions. Accordingly, gasoline has gained widespread use and today dominates the market for fuels used in combustion engines. Diesel combustion engines, however, provide significant advantages over engines using gasoline fuels, including improved energy efficiencies. Diesel fuels contain higher energy then gasoline with a typical gallon of No. 2 diesel containing over 140,000 Btus compared to 115,000 Btus in a gallon of gasoline.

Hybrid diesel fuel formulations have been developed to address various problems associated with diesel fuels and their combustion. For example, for purposes of economics, combustion characteristics, and availability, ethanol has been used in hybrid diesel fuel formulations. While anhydrous ethanol and diesel fuel are miscible at room temperature, trace amounts of water in the mixture may cause phase separation when the ethanol is mixed with the diesel fuel. Furthermore, as the temperature is lowered, the fuel's tolerance to take on water is diminished. Water present in the diesel fuel undesirably separates from the fuel to form an immiscible layer. This water aggregate is undesirable as it leads to erratic combustion, poor combustion emissions, and could corrode components of the fuel delivery system, storage, and combustion engine.

To address water contamination problem, conventional diesel fuel industry typically adds de-emulsyfying agents that repel water into a separate layer during storage. However, this provides little or no protection against water exposure during fuel use. Presence of separated water in a compression ignition diesel engine results in a sudden loss of power and erratic drivability. Hence techniques based on integrating the water into diesel fuel rather then repelling it from the fuel promise better performance and combustion characteristics.

Hybrid diesel fuel emulsions and microemulsions have been developed to improve the water tolerance of diesel fuels. Such emulsions and microemulsions include, for example, a mixture of the diesel fuel, water, an alcohol, and a combination of surface-active agents made up of a variety of salts of long-chain fatty acids. See e.g., U.S. Pat. No. 4,083,698. U.S. Pat. No. 4,451,265 describes a microemulsion containing diesel fuel, water, water-miscible alcohols, and a surfactant system using N,N-dimethyl ethanolamine and a long-chain fatty acid substance. A major disadvantage of emulsion and microemulsion fuel formulations, however, is the lack of stability (i.e., temperature and time stability) under the type of conditions which the fuel formulations can be expected to encounter. In general, microemulsions have a tendency to de-emulsify under increased pressures, such as those experienced in compression-ignition diesel engines. Microemulsions also have a tendency to de-emulsify at high and low temperatures. Efforts to stabilize microemulsions over a temperature range of −20° C. to +70° C. are taught by U.S. Pat. No. 4,744,796. Regardless of these advances, however, emulsions and microemulsions have physical properties which limit their use in unmodified combustion engines.

Additionally, hybrid diesel fuel formulations require time-intensive and energy-intensive preparation procedure(s). Because it is very difficult to homogenize a mixture of a low molecular weight alcohol, such as ethanol, and higher molecular weight hydrocarbons, such as diesel fuel, most emulsion and microemulsion fuels require expensive blending operations employing an emulsifying agent. For example, such emulsions are typically prepared by vigorous mixing, recirculating, and heating (e.g., to a temperature of about 50° C. or more, for example about 72° C.) for about 20 minutes to provide a homogenized emulsion, usually opaque in appearance. This energy intensive process translates into significant economic penalty resulting into a product with little or no commercial viability.

Accordingly, it would be desirable to provide a temperature-and time-stable, clear diesel fuel composition for use in combustion engines, and preferably unmodified combustion engines, that more closely emulates the physical properties of conventional diesel fuel, yet employs less of the actual base diesel fuel. Additionally, it would be desirable to provide a diesel fuel formulation that can accommodate water contamination. Furthermore, it would be desirable to provide a fuel composition that has improved emissions as compared to a base diesel fuel (either No. 1 diesel fuel or No. 2 diesel fuel). Still further, it would be desirable to provide a fuel composition that can be prepared readily without the need for energy-intensive blending procedures.

SUMMARY OF THE INVENTION

The invention is directed to a solubilized fuel composition. The components of the fuel solution include a diesel fuel, ethanol, a stabilizing additive and, optionally, an alkyl ester of a fatty acid and/or a co-solvent. The stabilizing additive is either a mixture, a polymeric material, or a combination of the mixture and the polymeric material, depending upon a variety of factors including the diesel fuel cetane number and the amount of water present in the solution, for example.

The stabilizing additive may be a mixture including two different ethoxylated fatty alcohols having a hydrocarbon chain length of about 9 to about 13 carbon atoms present in a molar ratio with respect to each other of about 1:3 to about 3:1, inclusive. The mixture also includes 0 volume percent (vol. %) to about 10 vol. %, inclusive, based on the volume of the mixture, of a cetane booster, and may contain 0 vol. % to less than about 5 vol. % of a demulsifier based on the volume of the mixture. The stabilizing additive may also be a polymeric additive that is a reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid; and, (b) an ethoxylated fatty acid or derivative thereof having a hydrocarbon chain length of about 9 to about 15 carbon atoms.

The cosolvent, when present, is selected from the group consisting of alkyl alcohols having a hydrocarbon chain length of about three to about six, inclusive, such as tertiary butyl alcohol, naphtha, γ-valerolactone, kerosene, hydrocarbons having a chain length of greater than about 50, and mixtures thereof.

Typically, diesel fuel is present in the solution in an amount of about 60 vol. % to about 95 vol. %, ethanol is present in the solution in an amount of about 3 vol. % to about 18 vol. %, the stabilizing additive is present in the solution in an amount of about 0.5 vol. % to about 10 vol. %, the alkyl ester of a fatty acid is present in the solution in an amount of about 0 vol. % to about 5.5 vol. %, and the co-solvent is present in the solution in an amount of about 0 vol. % to about 10 vol. %, based on the total volume of the composition.

Further aspects and advantages of the invention may become apparent to those skilled in the art from a review of the following detailed description, taken in conjunction with the examples and the appended claims. It should be noted that while the invention is susceptible of embodiments in various forms, described hereinafter are specific embodiments of the invention with the understanding that the present disclosure is intended as illustrative, and is not intended to limit the invention to the specific embodiments described herein.

BRIEF DESCRIPTION OF THE DRAWING

The sole FIGURE is a graph of phase separation temperature vs. concentration of a stabilizing additive for fuels according to the invention containing various amounts of water.

DETAILED DESCRIPTION OF THE PREFERRED EMBODIMENTS

A solubilized diesel fuel composition according to the invention is a solution that includes a diesel fuel, ethanol, a stabilizing additive and, optionally, an alkyl ester of a fatty acid, preferably ethyl soy ester or methyl soy ester derived through trans-esterfication of soybean oil in the presence of ethanol or methanol and/or a co-solvent. The stabilizing additive is either a mixture, a polymeric material, or a combination of the mixture and the polymeric material, depending upon a variety of factors including the diesel fuel cetane number and the amount of water present in the solution, for example. The stabilizing additive also may be considered a blending additive as it allows "splash" blending of the ethanol with the diesel fuel without the need for extensive mechanical mixing, recirculating, and/or heating.

The stabilizing additive may be a mixture including two different ethoxylated fatty alcohols having a hydrocarbon chain length of about 9 to about 13 carbon atoms present in a molar ratio with respect to each other of about 1:3 to about 3:1. The mixture also includes 0 vol. % to about 10 vol. %, inclusive, based on the volume of the mixture, of a cetane booster, and 0 to less than about 5 vol. % of a demulsifier based on the volume of the mixture. The polymeric stabilizing additive is a reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid; and, (b) an ethoxylated fatty acid or derivative thereof having a hydrocarbon chain length of about 9 to about 15 carbon atoms.

The cosolvent, when present, is preferably selected from the group consisting of alkyl alcohols having a hydrocarbon chain length of about three to about six, inclusive, such as tertiary butyl alcohol, for example; naphtha; γ-valerolactone; kerosene; hydrocarbons having a chain length of greater than about 50; and mixtures thereof.

Generally, diesel fuel is present in the solution in an amount of about 60 vol. % to about 95 vol. %, inclusive, the ethanol is present in the solution in amount of about 3 vol. % to about 18 vol. %, inclusive, the alkyl ester of a fatty acid is present in the solution in an amount of about 0 vol. % to about 5.5 vol. %, inclusive, and the co-solvent is present in the solution in an amount of about 0 vol. % to about 10 vol. %, inclusive, based on the total volume of the composition.

Any diesel fuel may be used in the inventive fuel composition depending on the given engine application, however, diesel fuel No. 1 and/or diesel fuel No. 2 are preferably used in the inventive fuel composition. Diesel fuel generally is obtained from the distillation of petroleum and is made up of a number of long-chain hydrocarbons (e.g., unbranced paraffins). Its efficiency is measured by the cetane rating (i.e., the cetane number). Suitable diesel fuels for use in accordance with the invention generally have a cetane rating of about 25 to about 60, preferably about 40 to about 50. The amount of diesel fuel blended to form the inventive fuel composition preferably is present in the solution in a range of about 65 vol. % to about 89 vol. %, inclusive, based on the total volume of the fuel composition. In one preferred embodiment, the amount of diesel is present in the solution in a range of about 72 vol. % to about 89 vol. %, more preferably about 78.5 vol. % to about 86 vol. %, and most preferably about 82.6 vol. % to about 85 vol. % based on the total volume of the fuel composition. In another preferred embodiment, the amount of diesel is present in the solution in a range of about 60 vol. % to about 84 vol. %, and more preferably about 67 vol. % to about 78.5 vol. %, and most preferably about 69 vol. % to about 74.6 vol. % based on the total volume of the fuel composition.

The inventive fuel composition also includes ethanol. Ethanol typically is produced by fermentation of sugars derived from grains or other biomass materials. Ethanol suitable for use in accordance with the invention preferably includes fuel grade ethanol derived from yeast or bacterial fermentation of starch-based six-carbon sugars. Such starch-based six-carbon sugars may be extracted from corn, sugarcane, and sugar beet. Alternatively, fuel grade ethanol may be produced via known dilute and/or concentrated acid and/or enzymatic hydrolysis of a particular biomass material known as lignocellulosic material. Biomass may be collected from waste industrial sources including, for example, cellulosic portions of municipal solid waste, including waste paper, paper sludge, saw dust. Additionally, biomass may be collected from agricultural residues including, for example, rice husks, bagasse, and paper-mill sludge.

A suitable fuel grade ethanol for use in accordance with the invention may contain about 0.8 to about 1.2 percent by weight water (referred to hereafter as "anhydrous ethanol"). Alternatively, another fuel grade ethanol suitable for use in the invention may contain higher amounts of water, up to about five percent by weight (referred to hereafter as "hydrous ethanol").

When hydrous fuel grade ethanol is blended in accordance with the invention, the preferred stabilizing additive is the reaction product of (a) a mixture of an ethoxylated alcohol and an amide, wherein the ethoxylated alcohol includes at least about 75 weight percent of at least one linear straight chain alcohol having a hydrocarbon chain length of about 9 to about 15 carbon atoms, and wherein the amide is a substantially equimolar reaction product of an alcohol amine and an alkyl ester of a fatty acid, and (b) an ethoxylated fatty acid or derivative thereof having a hydrocarbon chain length of about 9 to about 15 carbon atom. The particular reactants comprising this additive and their specific proportions are determined by the make-up of the fuel composition, for example the amount of water present in the composition. The particular additive is described in more detail below.

Heretofore, use of a hydrous ethanol in combination with a diesel fuel posed problems wherein the ethanol/diesel fuel mixture would undesirably separate into two distinct phases and render the resultant mixture unsuitable for use as a combustible fuel. In combination with the particular additive (and the alkyl ester of a fatty acid and/or the co-solvent, when present), hydrous ethanol may be blended satisfactorily with conventional diesel fuel without forming two phases. Quite surprisingly, it has been found that hydrous fuel grade ethanol blended in accordance with the invention may impart desirable combustion characteristics to the overall fuel composition, such as improved fuel stability, lower particulate matter and $NO_x$ emissions, improved antiknock characteristics, and/or improved anti-freeze characteristics.

Generally, the amount of fuel grade ethanol blended to form the inventive fuel composition preferably is in a range of about 3 vol. % to about 20 vol. %, inclusive, based on the total volume of the fuel composition. In a preferred embodiment, the amount of fuel grade ethanol is present in the solution in a range of about 3 vol. % to about 18 vol. %, and more preferably about 13 vol. % to about 16 vol. %, and most preferably about 14 vol. % to about 15 vol. % based on the total volume of the fuel composition.

While not intending to be bound by any particular theory, it is believed that the various long-chain hydrocarbons which make up diesel fuel have weakly charged sites (referred to hereafter as "hydrogen bonding sites") which, when mixed with an alcohol, such as ethanol, for example, repel the hydroxyl group of the ethanol. By repelling alcohol molecules, the charged molecular bonding sites ensure an undesirable two-phase mixture of the fuel and ethanol.

The long-chain hydrocarbons also contain some neutralized hydrogen bonding sites available to form van der Waals' bonds or hydrogen bonding with ethanol. The higher the number of hydrogen bonding sites available for bonding with ethanol, the more ethanol can be solubilized by a given volume of diesel fuel. For example, given that a diesel fuel A has x number of hydrogen bonding sites available for bonding with ethanol, the diesel fuel A can solubilize y parts of ethanol per part of fuel. If another diesel fuel (diesel fuel B) has 10x number of hydrogen bonding sites available for bonding with ethanol then, presumably, diesel fuel B can solubilize greater than y parts (e.g., 10y parts) of ethanol per part of fuel. Under this theory, less diesel fuel is required in a diesel fuel/ethanol mixture where there are a high number of hydrogen bonding sites available for bonding with ethanol. Accordingly, a higher volume of ethanol will be desirably present in the mixture, and the mixture will have less diesel fuel.

However, the concentration of available bonding sites in a given diesel fuel is a function of its molecular composition and its electrochemical properties. While the molecular composition of a given diesel is fixed once the diesel fuel has been produced, its electrochemical characteristics and hence its ethanol solubilizing capability can be manipulated with the help of external additive systems fuels as the one described in the invention.

Ethoxylate groups found, for example, in ethoxylated fatty acids or ethoxylated fatty alcohols, interact with and neutralize the charged hydrogen bonding sites. One ethoxylate group can neutralize substantially all of the hydrogen bonding sites on one long-chain hydrocarbon molecule based on cascade mechanism. Electrons associated with each of the positively-charged hydrogen bonding sites will migrate to compensate for the neutralization of one hydrogen bonding site. Because the migration is never static (i.e., it is in constant flux), the overall effect is that all hydrogen bonding sites on the molecule appear to be (and behave as though they are) neutralized and, therefore, available for covalent bonding with ethanol.

Ethanol and diesel fuel bonding can occur as a result of both covalent and through weak van der Waals' forces.

Covalent bonding results when electrons are shared by the atomic nuclei of the hydroxyl group and the hydrogen bonding site. Covalent bonding does not result in a change in morphology of the fuel composition and enables the long-chain hydrocarbon to retain its physical properties. In contrast, ionic bonding is a much more strong bond and undesirably results in a morphological change in the fuel composition. Van der Waals' forces are weak electromagnetic forces that provide association of two different molecules.

If there is no water present in the diesel fuel/ethanol mixture, then all of the neutralized hydrogen bonding sites are available for bonding with the ethanol. However, when water, even in trace amounts, is present in the mixture, the available hydrogen bonding sites preferentially form hydrogen bonds with water molecules, instead of with ethanol. Thus, the presence of water in the diesel fuel/ethanol mixture reduces the number of available hydrogen bonding sites for bonding with ethanol.

The preference for water molecules over ethanol molecules is believed to exist because water molecules provide two hydrogen atoms bonded to an oxygen atom for covalent bonding whereas ethanol provides only one hydrogen atom bonded to an oxygen atom. Coupled with the smaller molecule size compared to an ethanol molecule, this results in a more strong covalent bond with water. Accordingly, the hydrogen bond between the water molecule and hydrogen bonding site is more difficult to break because there are two hydrogen atoms that are participating in the bond with the hydrogen group of the long-chain hydrocarbon. Dependingupon the temperature of the mixture, a two-phase liquid can result instead of the desired homogenous, clear solution.

In a simple diesel fuel/ethanol mixture, the presence of water and its effect on the mixture is exacerbated with lower temperatures of the mixture, especially below 4° C. Because water, unlike any other fuel constituent, can exist in three distinct phases when the temperature is at or near its freezing point and at atmospheric pressure, the mixture will become an opaque two-phase mixture. At or near its freezing point, water molecules compete more fervently for the available hydrogen bonding sites on the long-chain hydrocarbon molecules, thus making it more difficult to solubilize ethanol.

Once the temperature has been lowered and hydrogen bonding is preferentially occurring with water molecules instead of ethanol, the hydrogen bond between the water and the long-chain hydrocarbon is very difficult to break for the reasons stated above. The same bond between ethanol and the long-chain hydrocarbon molecule is easier to break. Even when the temperature of the mixture is returned to its original state, however, the hydrogen bond with water is not likely to break due to its strength. This is physically observable by the fact that the diesel fuel/ethanol mixture remains as a cloudy, opaque suspension for a prolonged time period after the temperature has been raised.

While not intending to be bound by any particular theory, it is believed that the stabilizing additive and the co-solvent, when present, interfere with the ability of water molecules to compete for the available hydrogen bonding sites, regardless of temperature. Furthermore, it has been found that the stabilizing additive and, optionally, the alkyl ester of a fatty acid in the inventive fuel composition provide ethoxylates for neutralizing the positively-charged hydrogen bonding sites and ensuring that a sufficient number of hydrogen bonding sites are available despite the presence of water. Higher volumes of the stabilizing additive are believed to ensure a greater number of hydrogen bonding sites available for covalent bonding with ethanol.

A preferable co-solvent is a material selected from the group comprising, consisting essentially of, and/or consisting of alkyl alcohols having a hydrocarbon chain length of about three to about six, inclusive, such as tertiary butyl alcohol, naphtha, γ-valerolactone, kerosene, hydrocarbons having a chain length of greater than about 50, and mixtures thereof. The co-solvent may be acquired from petrochemical sources and/or renewable sources derived from biomass materials. The co-solvent used in the invention is present in the solution in small quantities, if used at all, when compared to other fuel composition constituents, such as the diesel fuel and ethanol. It should be noted that the co-solvent is not necessary to achieve the desired results. Presence of the co-solvent, however, provides desirable time and temperature stability buffers for ethanol and hydrocarbon components of the fuel composition. Presence of the co-solvent also enhances certain key properties of the blended fuel composition, such as fuel lubricity and fuel flow properties (e.g., viscosity), which raise a regular-grade fuel quality to that of premium-grade specifications.

Generally, the amount of co-solvent blended to form the inventive fuel composition preferably is in a range of 0 vol. % to about 10 vol. %, inclusive, based on the total volume of the fuel composition. More preferably, however, the amount of co-solvent is present in the solution in a range of about 6 vol. % to about 8 vol. %, and most preferably about 6.9 vol. % to about 7.5 vol. %, based on the total volume of the fuel composition.

The inventive fuel composition also includes a stabilizing additive to, among other things, homogenize the constituents of the fuel composition. The additive is selected from two groups of materials, one of which is a polymeric material, and the other being a mixture of fatty acid alcohols, a cetane booster, and a demulsifier. The stabilizing additive may also include a combination of the mixture and the polymeric material. Generally, the additive is present in the solution in a range of about of about 0.5 vol. % to about 10 vol. %, inclusive, based on the total volume of the fuel composition.

When the composition contains no co-solvent, the preferred stabilizing additive is the polymeric additive, described below, and is present in the solution in an amount of about 0.5 vol. % to about 10 vol. %, inclusive, based on the total volume of the composition. More preferably, the polymeric additive is present in an amount of about 0.7 vol. % to about 5.35 vol. %, and most preferably about 1.2 vol. % to about 2.25 vol. %, based on the total volume of the composition.

When the composition contains a co-solvent, then the stabilizing additive may be the mixture alone, the polymeric material alone, or a combination of the mixture and the polymeric material. In such a case, the stabilizing additive is present in the solution in an amount of about 0.5 vol. % to about 7.5 vol. %, inclusive, based on the total volume of the composition. More preferably, the polymeric additive is present in the solution in an amount of about 1 vol. % to about 6 vol. %, and most preferably about 3 vol. % to about 6 vol. %, based on the total volume of the composition.

The polymeric material includes an ethoxylated alcohol comprising at least about 75 weight percent of at least one linear, straight-chain alcohol having a hydrocarbon chain length of about nine to about fifteen carbon atoms, and a substantially equimolar (with respect to the alcohol) amount of an amide formed by reacting an alcohol amine with an equimolar amount of an alkyl ester of a fatty acid, preferably at a reaction temperature of about 100° C. to about 110° C. Still further, the material includes an equimolar amount of an ethoxylated fatty acid formed by reacting an unmodified fatty acid with ethylene oxide. Preferably, the material includes equimolar amounts of each of the ethoxylated alcohol, amide, and ethoxylated fatty acid.

The material and methods for the manufacture of the polymeric material are described in more detail in co-pending, commonly-assigned U.S. patent application Ser. No. 08/953,809 filed on Oct. 20, 1997, now U.S, Pat. No. 6,074,445 issued Jun. 13, 2000, the disclosure of which is hereby incorporated herein by reference. Briefly, the material is prepared by forming a reaction product of substantially equimolar amounts of the ethoxylated alcohol and the amide, preferably at a temperature of about 55° C. to about 58° C., and subsequently isothermally reacting the resulting product with an equimolar amount of the ethoxylated fatty acid. In preparing the material, the ethoxylated alcohol and fatty acid act as monomers while the amide serves as the chain initiator. Each of the alcohol, amide, and fatty acid may be dissolved in a solvent for purposes of facilitating the industrial-scale manufacture of the polymeric material.

The unmodified fatty acid and the alcohol are ethoxylated using an ethoxylating agent, such as ethylene oxide, prior to forming the material. The overall degree of ethoxylation of the material preferably is maximized to achieve maximum water solubilization without detrimentally affecting the performance characteristics of the fuel composition. Increasing the degree of ethoxylation likely results in an undesirable phase change of the ethoxylated higher alcohols and fatty acids from a liquid to a solid limiting its application to the fuel composition. The disadvantage of having a lower degree of ethoxylation is that higher quantities of the material are required to achieve a desired result. Higher concentrations of the material in a given application are limited both by cost and legal regulations. For example, any substance added in quantities above 0.25 percent must be reported with its full life-cycle evaluation under environmental regulations which could further limit the commercial viability of the polymeric material.

Commercially-available sources of alcohols utilize both straight-chain and branched-chain synthetic alcohols (i.e., isomers) and/or naturally-occurring alcohols such as oleic, lauric, palmitic, stearic, and other alcohols of higher fatty acids. Commercially available alcohols, such as SYNPERONIC 91/2.5 and SYNPERONIC A3, which are manufactured by ICI Chemicals, and DOBANAL 91/2.5, which is manufactured by Shell Chemical, contain large quantities of isomers. For example, the SYNPERONIC class of alcohols contain as much as 50 weight percent branched isomers. Presence of branched isomers in the polymeric material is undesirable because branched isomers limit the degree of ethoxylation that can be achieved before the onset of a phase change from a liquid to a solid.

The NEODOL class of alcohols, such as the NEODOL 91–2.5 and NEODOL 1–3 products, have low concentrations of branched isomers, and typically have a linear, straight-chain alcohol concentration of about 75 weight percent to about 85 weight percent and an average molecular weight of 160. (The NEODOL class of alcohols are ethoxylated to 2.5 or 3.0 degrees of ethoxylation per mole of alcohol as represented by the "91–2.5" and "1–3," respectively.) Most other commercially available alcohols have molecular weights exceeding 200. It has been determined, however, that lower molecular weight alcohols will permit a higher degree of ethoxylation without the onset of a phase change from a liquid to a solid. Thus, the ethoxylated alcohol preferably should have a molecular weight of less than about 200, and highly preferably less than about 160. Attempts to achieve a higher degree of ethoxylation with a higher molecular weight alcohol would result in the onset of a phase change at lower concentrations of the ethoxylating agent then with a lower molecular weight alcohol.

The material is prepared using ethoxylated alcohols having as low a concentration of branched-chain molecules as possible. The ethoxylated alcohol used in the preparation of the material should also have as large a chain length as possible without increasing the viscosity so much that a phase change occurs, the onset of which is typically indicated by increased surface tension. Increased surface tension of higher alcohols results in the solidification of the material and suppresses the blending and performance characteristics of the fuel.

Conventional amides are prepared by reacting a fatty acid with an alcohol amine in a 2:1 molar ratio at a temperature between 160° C. and 180° C. Such amides, however, are contaminated with free amines, which are not conducive to ethoxylation. It has been discovered that a superamide works better then conventional amides (such as, ethanolamide, diethanolamide, and triethanolamide) in the preparation of the polymeric material. Superamides for use in the polymeric material are preferably prepared by heating an alkyl ester of a fatty acid with an equimolar amount of an alcohol amine (e.g., ethanolamine) at temperature of about 100° C. to about 110° C. Superamides contain little to no free amines.

An unmodified higher fatty acid or derivative having a hydrocarbon chain length of at least about nine carbon atoms may be ethoxylated using ethylene oxide in a molar ratio of 7:1 (seven degrees of ethoxylate per mole of fatty acid). Unmodified fatty acid ethoxylation produces a 90–95 percent ethoxylated fatty acid. However, conventional ethoxylated fatty acids used in the preparation of prior polymeric materials used a polyglycol ether of a higher fatty acid and not an unmodified higher fatty acid. Ethoxylation of a polyglycol ether of a higher fatty acid results in a poorly ethoxylated end-product. Furthermore, the commercially available ethoxylated fatty acids based on polyglycol ether show significantly lower end-product yields due to the presence of free polyethylene glycol. A lower degree of ethoxylation of the fatty acid results in an inferior effect of the material and hence larger quantities to achieve same result.

The ethoxylated alcohol and the amide are blended together under conditions such that the formed blend does not experience phase inversion from a liquid solution to a solid. It has been determined that isothermally blending, as by mixing, the alcohol and amide at a temperature of about 55° C. to about 58° C. with gentle mixing results in a solution, which does not solidify, and that the solution viscosity does not significantly change when the solution is cooled to a temperature below about 55° C. to about 58° C. Heretofore, it has not been possible to create such a blend that was not also temperature sensitive. An ethoxylated fatty acid is subsequently contacted, as by mixing, with the blend at a constant temperature of about 55° C. to about 58° C. to result in the polymeric material.

The particular hydrocarbon chain length of each of the ethoxylated alcohol, the ethoxylated fatty acid, and the alkyl ester of a fatty acid are preferably selected according to the compositional make-up of the fuel. Generally, it is believed that the selected hydrocarbon chain length of the ethoxylated alcohol and the ethoxylated fatty acid should be similar to the average chain length of the hydrocarbon compounds comprising the fuel. It is also believed that an even higher-performance material may be produced by forming an individual additive corresponding to each hydrocarbon constituent of the fuel, and subsequently blending the formed additives to form one stabilizing additive based on the relative concentration of the hydrocarbon constituents in the fuel. The greater the variety of hydrocarbon constituents, the more desirable it would be to make a blend of additives corresponding to selected hydrocarbon constituents of the fuel. Hence, for a diesel fuel, which is known to contain approximately twenty hydrocarbon constituents having chain lengths from about eight to about 30 carbon atoms, it would be advantageous to make an additive for a number of these constituents and then blend the additives into one stabilizing additive based on the relative concentration of each constituent.

Accordingly, an alternative and/or in addition to the polymeric material is a mixture of ethoxylated fatty alcohols, a cetane booster, and a demulsifier. More specifically, the mixture includes two different ethoxylated fatty alcohols having a hydrocarbon chain length of about 9 to about 13 carbon atoms, the two alcohols being present in a molar ratio with respect to each other of about 1:3 to about 3:1, inclusive. Preferably, the hydrocarbon chain length of the ethoxylated fatty alcohols is about 9 to about 11 carbon atoms. The mixture also contains a cetane booster in amount of 0 vol. % to about 10 vol. %, based on the volume of the mixture. Furthermore, the mixture also includes a demulsifier in an amount less than about 5 vol. %, and preferably less than about 1 vol. % based on the volume of the mixture. It is possible, however, to prepare the mixture without the cetane booster and to admix the cetane booster directly into the composition.

A suitable cetane booster for use in the mixture is selected from the group comprising, consisting essentially of, and/or consisting of 2-ethylhexylnitrate, tertiary butyl peroxide, diethylene glycol methyl ether, cyclohexanol, and mixtures thereof. The amount of cetane booster present in the mixture is a function of the cetane value of the particular diesel fuel and the amount of ethanol present in the particular fuel composition. Generally, the lower the diesel fuel cetane value, the higher the amount of the cetane booster. Similarly, because ethanol typically acts as a cetane depressant, the higher the concentration of ethanol in the solution, the more cetane booster necessary in the mixture. For example, when using a diesel fuel having a cetane value of about 50 or higher, the amount of cetane booster preferred is about 0.2 vol. % based on the volume of the composition, whereas when the cetane value of the diesel fuel is 40, the amount of cetane preferred is higher, such as greater than about 0.35 vol. % based on the volume of the composition. Amounts of cetane booster exceeding 0.5% volume are commercially prohibitive.

The fuel composition optionally can include an alkyl ester of a fatty acid. Preferably the alkyl ester of a fatty acid has a hydrocarbon chain length of about 4 to about 22 carbon atoms, and preferably about 7 to about 18 carbon atoms. Such fatty acids are generally derived from animal and/or vegetable fats and oils. In accordance with the invention, the alkyl ester preferably is a soy bean oil-derived methyl ester or an ethyl ester.

The alkyl ester of a fatty acid used in the invention is present in the solution in small quantities, if at all, when compared to other fuel composition constituents, such as the diesel fuel and ethanol. It should be noted that the alkyl ester of a fatty acid is not necessary to achieve the desired results. Presence of the alkyl ester of a fatty acid, however, provides desirable lubricity characteristics.

When present, the amount of alkyl ester blended to form the inventive fuel composition preferably is in a range of about 4.5 vol. % or less, based on the total volume of the fuel composition. In other words, alkyl ester of a fatty acid is used in the inventive fuel composition in an amount of about 0 vol. % to about 4.5 vol. %, based on the total volume of the fuel composition. In a preferred embodiment, the amount of alkyl ester is present in the solution in a range of about 0.1 vol. % to about 0.2 vol. %, more preferably about 0.13 vol. % to about 0.16 vol. %, and most preferably about 0.14 vol. % to about 0.16 vol. %, based on the total volume of the fuel composition. In another preferred embodiment, the amount of alkyl ester is present in the solution in a range of about 1.5 vol. % to about 4.5 vol. %, more preferably about 1.5 vol. % to about 3 vol. %, and most preferably about 1.5 vol. % to about 2.5 vol. %, based on the total volume of the fuel composition.

While not intending to be bound by any particular theory, it is believed that the amount of the alkyl ester present in the solution is dependent upon the concentration of ethanol and water in the solution, and the amount of ethoxylated fatty alcohols making up the stabilizing additive. It is believed that the ethanol and water decrease the lubricity of the overall composition, whereas the ethoxylated fatty alcohols have an opposite effect on the lubricity of the overall fuel composition. The alkyl ester, therefore, is selected and present in the solution in an effort to balance the lubricity effects to more precisely emulate the lubricity of the base diesel fuel used in the fuel composition.

Additionally, the concentration of alkyl ester in the fuel composition depends upon the temperature at which the combustion ignition engine is expected to operate at. For example, during the colder winter months (e.g., when temperatures may be as low as about minus 20° C.), it is believed that the amount of alkyl esters necessary in the fuel composition will be less than that necessary during warmer summer months (e.g., when fuel tank temperatures approach about 65° C.).

The solubilized fuel composition of the invention provides a number of benefits. For example, the fuel composition remains stable over a range of ambient temperatures (about −20° C. to about +65° C.) through winter and summer months. Additionally, the fuel composition remains a clear, transparent stable solution even in the presence of water-contamination of up to about 5 vol. %. Additionally, the fuel composition meets the federal minimum cetane number requirement and meets or exceeds ASTM D975 diesel fuel specifications and, therefore, can be classified as a "splash blendable" fuel (i.e., can be prepared readily within minutes without the necessity of any energy-intensive blending, recirculating, and/or heating procedures). Still further, the fuel composition meets fuel lubricity minimum requirements based on Scuffing Load Ball on Cylinder Lubrication Evaluation and/or High Frequency Reciprocating Rig test methods. It is believed that the fuel composition when burned in an unmodified combustion ignition engine results in a reduced tail-pipe sulfur emissions when compared to a base No. 2 diesel fuel. Furthermore, a reduction in aromatic content of about 20% is achieved in the formulation of the fuel composition which will lead to improved emissions characteristics.

EXAMPLES

The following examples are provided to further illustrate the invention but are not intended to limit the scope thereof. Specifically, the following examples are provided to illustrate the composition, manufacture and physical characteristics of the inventive fuel composition versus conventional diesel fuel.

Example 1 includes a comparison of physical properties of a fuel composition according to the invention and a No. 2 diesel fuel. Example 2 provides a comparison of the distillation data of a base No. 2 diesel fuel to winter- and summer-blends of a fuel composition of the invention. Examples 3–5 illustrate alternative formulations of fuel compositions according to the invention.

Example 1

A fuel composition was prepared for purposes of comparing physical characteristics to that of base No. 2 diesel fuel. The fuel composition was prepared by combining less than about 5 vol. % of a stabilizing additive. This mixture was then combined with about 15 vol. % of anhydrous ethanol, and to this mixture was added about 80 vol. % No. 2 diesel fuel. No stirring or external mixing was necessary to form a clear, transparent solution.

The prepared fuel composition was tested by various standardized tests to determine physical property data, which are provided in the following Table I along with the corresponding physical property data for base No. 2 diesel fuel, for comparison purposes.

TABLE I

| Property | Test Method | No. 2 Diesel | Inventive Fuel |
|---|---|---|---|
| Water & Sediment (% max) | ASTM D1796 | 0.05 | 0 |
| Distillation (% vol. rec. T-90° C.) | ASTM D 86 | 332 | 311 |
| Kinematic Viscosity (40° C., (cSt)) | ASTM D445 | 1.9 to 4.1 | 2.25 |
| Ash (% max) | ASTM D482 | 0.01 | 0.001 |
| Sulfur (% max) | ASTM D2622 | 0.05 | 0.01 |
| Copper Corrosion @ 3-hour max | ASTM D130 | 3b | 1a |

TABLE I-continued

| Property | Test Method | No. 2 Diesel | Inventive Fuel |
|---|---|---|---|
| Cetane Number, min | ASTM D613 | 40 | 45 |
| Cetane Index, min | ASTM D4737 | 45 | 42 |
| Rams, Carbon (10% res) | ASTM D4530 | 0.35 | 0.22 |
| API Gravity, max | ASTM D287 | 39 | 38 |
| Lubricity (g) min | ASTM D6078 | 3100 | 5200 |
| Accel. Stability (pass/fail test) | Octel F-21 | Pass | Pass |
| Cloud Point (° C.) | ASTM D2500 | −15 | −5 |
| LTFT at −11° C. (pass/fail test) | ASTM D4539 | Pass | Pass |
| LTFT at −19° C. (pass/fail test) | ASTM D4539 | Fail | Pass |

From a review of the physical property data provided in Table I it is apparent that the prepared fuel composition exhibits characteristics very similar to those of the base No. 2 diesel fuel.

Example 2

A winter blend of ethanol and No. 2 diesel was prepared for use in a compression-ignition engine designed to operate at an ambient temperature range of about minus 19° C. to about minus 10° C. The additive composition and dosage varied based on diesel fuel cetane rating, water content of ethanol, ambient use temperature (winter vs. summer). For a No. 2 diesel fuel with a cetane rating of 44.5, fuel grade ethanol with 0.8% (by volume) water, and moisture-free soy methyl ester, the following composition was prepared.

The winter fuel formulation contained the following quantities of each of the component:

Fuel Composition

| Component | Volume Percent |
|---|---|
| No. 2 diesel fuel | 79.0 |
| Fuel-grade ethanol | 15.0 |
| Soy methyl ester | 0.15 |
| 2-ethylhexyl nitrate (EHN) | 0.35 |
| Additive* | 5.50 |

*a variable high additive dosage is used during winter months corresponding to an ambient use temperature range of about minus 19° C. to about minus 10° C. Any changes in the level of additive concentration are compensated by corresponding changes in diesel fuel concentration.

Additive Composition

| Component | Volume Percent |
|---|---|
| NEODOL 91-2.5 | 32.0 |
| NEODOL 1-3 | 64.5 |
| Nalco demulsifier #EC5459A | 3.5 |

The two NEODOL alcohols were first mixed at room temperature followed by the Nalco demulsifier. The cetane booster (EHN) was then added to the pre-mixed additive mixture followed by soy methyl ester, ethanol, and the No. 2 diesel. No stirring or external mixing was necessary.

A summer blend similar to the winter blend described above was designed for summer months from ethanol and No. 2 diesel and was prepared for use in a compression-ignition engine designed to operate at any ambient temperature between about 10° C. to about 65° C. (fuel tank temperature). For a No. 2 diesel fuel with a cetane rating of 44.5, fuel grade ethanol with 0.8% (by volume) water, and moisture free soy methyl ester, the following composition was prepared.

The summer fuel formulation contains the following quantities of each of the component:

Fuel Composition

| Component | Volume Percent |
|---|---|
| No. 2 diesel fuel | 83.0 |
| Fuel-grade ethanol | 15.0 |
| Soy methyl ester | 0.25 |
| t-butyl peroxide (TBP) | 0.25 |
| Additive* | 1.50 |

*variable low additive concentration was used during summer months which corresponded to an ambient temperature range of about 10° C. to about 65° C. (fuel tank temperature). The changes in the level of additive concentration were compensated by corresponding changes in the diesel fuel concentration.

Additive Composition

| Component | Volume Percent |
|---|---|
| NEODOL 91-2.5 | 62.0 |
| NEODOL 1-3 | 31.0 |
| Nalco demulsifier #EC5459A | 7.0 |

The two NEODOL alcohols were first mixed at room temperature followed by the cetane booster (TBP), and the Nalco demulsifier. The resultant additive mixture was then mixed with soy methyl ester, followed by splash blending with ethanol, and the No. 2 diesel. No stirring or external mixing was necessary.

The distillation data for both of the winter and summer blends and that of the No. 2 diesel fuel are shown in Table II below:

TABLE II

| Volume Distilled (%) | No. 2 Diesel (° F.) | Winter-Blend Fuel (° F.) | Summer-Blend Fuel (° F.) |
|---|---|---|---|
| IBP | 338.1 | 170.2 | 169.8 |
| 5 | 365.1 | 172.2 | 171.8 |
| 10 | 396.5 | 173.1 | 173.1 |
| 20 | 423.6 | 377.9 | 378.6 |
| 30 | 447.4 | 427.8 | 431.2 |
| 40 | 469.4 | 454.4 | 451.4 |
| 50 | 488.1 | 478.0 | 481.4 |
| 60 | 510.9 | 504.5 | 506.8 |
| 70 | 534.0 | 530.9 | 533.3 |
| 80 | 563.9 | 561.0 | 561.0 |
| 90 | 596.3 | 593.2 | 592.1 |

Although the distillation curve is similar, there is slight difference in both the initial boiling point (IBP) and middle and end temperatures.

Example 3

A fuel composition was prepared for use in a combustion ignition engine operating at an ambient temperature of about minus 10° C. to about 10° C. prepared in a manner similar to that described in Example 2, above. Compositional differences between the fuel composition here, however, including adjusting the molar ratio of the NEODOL alcohols to 1:1, stabilizing additive concentration to 3.5 vol. %, soy methyl ester concentration to 2.0 vol. % and cetane booster (EHN) concentration to 0.3 vol. %, and the Nalco demulsifier concentration to 5.0 vol. %.

| Fuel Composition | |
|---|---|
| Component | Volume Percent |
| No. 2 diesel fuel | 81.0 |
| Fuel-grade ethanol | 15.0 |
| Soy methyl ester | 0.20 |
| 2-ethylhexyl nitrate (EHN) | 0.30 |
| Additive* | 3.50 |

*a variable high additive dosage can be used within this composition to be selectively adjusted to the ambient use temperature range within about minus 10° C. to about 10° C. Any changes in the level of additive concentration were compensated by corresponding changes in the diesel fuel concentration.

| Additive Composition | |
|---|---|
| Component | Volume Percent |
| NEODOL 91-2.5 | 47.5 |
| NEODOL 1-3 | 47.5 |
| Nalco demulsifier #EC5459A | 5.0 |

The blending procedure was the same as that described in Example 2 above.

Example 4

A premium blend of ethanol and No. 2 diesel was prepared for use in a compression-ignition engine designed to operate at an ambient temperature range of about minus 19° C. to about 65° C. The additive composition and dosage varied based on diesel fuel cetane rating, water content of ethanol, ambient use temperature (winter vs. summer), and cosolvent present.

For a No. 2 diesel fuel with a cetane rating of 42, fuel grade ethanol with 1.2% (volume) water, and moisture free soy methyl ester, the following composition was prepared.

The fuel formulation contained the following quantities of each of the component:

| Fuel Composition | |
|---|---|
| Component | Volume Percent |
| No. 2 diesel fuel | 72.0 |
| Fuel-grade ethanol | 15.0 |
| Soy methyl ester | 2.0 |
| γ-Valerolactone | 5.0 |
| 2-ethylhexyl nitrate (EHN) | 0.35 |
| Additive* | 5.65 |

*a variable additive dosage can be used during summer and winter months corresponding to an ambient use temperature range of about minus 19° C. to about 65° C. Any changes in the level of additive dosage were compensated by corresponding changes in the diesel fuel concentration.

| Additive Composition | |
|---|---|
| Component | Volume Percent |
| NEODOL 91-2.5 | 29.0 |
| NEODOL 1-3 | 22.5 |
| Nalco demulsifier #EC5459A | 3.5 |
| Reaction Product Additive | 45.0 |

The reaction product additive of the additive composition was prepared by reacting (a) a mixture of NEODOL 91-2.5 and NEODOL 1-6 with (b) diethanolamide to form an intermediate, which was subsequently reacted with oleic acid. The mixture of NEODOL alcohols made up about 50 percent of the reaction product additive, and the diethanolamide and oleic acid each comprised about 25 volume percent of the reaction product additive, based on the total volume of the reaction product additive. The additive composition was prepared by first mixing NEODOL 91-2.5 with NEODOL 1-3 at room temperature followed by admixing the reaction product additive, the demulsifier, and the cetane booster (EHN). The resultant additive mixture is then mixed with soy methyl ester, followed by mixing it with γ-valerolactone, ethanol, and the No. 2 diesel fuel. No stirring or external mixing was necessary.

Example 5

A winter blend of ethanol and No. 2 diesel was prepared for use in a compression-ignition engine designed to operate at an ambient temperature range of about minus 19° C. to about minus 10° C. The additive composition and dosage varied based on diesel fuel cetane rating, water content of ethanol, ambient use temperature (winter vs. summer). For a No. 2 diesel fuel with a cetane rating of 44.5, fuel grade ethanol with 0.8% (by volume) water, and moisture-free soy methyl ester, the following composition was prepared.

The winter fuel formulation contained the following quantities of each of the component:

| Fuel Composition | |
|---|---|
| Component | Volume Percent |
| No. 2 diesel fuel | 79.65 |
| Fuel-grade ethanol | 15.0 |
| 2-ethylhexyl nitrate (EHN) | 0.35 |
| Additive* | 5.0 |

*a variable high additive dosage is used during winter months corresponding to an ambient use temperature range of about minus 19° C. to about minus 10° C. Any changes in the level of additive concentration are compensated by corresponding changes in diesel fuel concentration.

| Additive Composition | |
|---|---|
| Component | Volume Percent |
| NEODOL 91-2.5 | 50 |
| NEODOL 1-3 | 50 |

The two NEODOL alcohols were mixed at room temperature. The cetane booster (EHN) was then added to the pre-mixed additive mixture followed by ethanol, and the No. 2 diesel. No stirring or external mixing was necessary.

A summer blend similar to the winter blend described above was designed for summer months from ethanol and No. 2 diesel and was prepared for use in a compression-ignition engine designed to operate at any ambient temperature between about 10° C. to about 65° C. (fuel tank temperature). For a No. 2 diesel fuel with a cetane rating of 44.5, fuel grade ethanol with 0.8% (by volume) water, and moisture free soy methyl ester, the following composition was prepared.

The summer fuel formulation contains the following quantities of each of the component:

Fuel Composition

| Component | Volume Percent |
|---|---|
| No. 2 diesel fuel | 82.15 |
| Fuel-grade ethanol | 15.0 |
| 2-ethylhexyl nitrate (EHN) | 0.35 |
| Additive* | 2.5 |

*variable low additive concentration was used during summer months which corresponded to an ambient temperature range of about 10° C. to about 65° C. (fuel tank temperature). The changes in the level of additive concentration were compensated by corresponding changes in the diesel fuel concentration.

Additive Composition

| Component | Volume Percent |
|---|---|
| NEODOL 91-2.5 | 75 |
| NEODOL 1-3 | 25 |

The two NEODOL alcohols were first mixed at room temperature followed by the cetane booster (EHN). The resultant additive mixture was then splash blended with ethanol and No. 2 diesel fuel. No stirring or external mixing was necessary.

Example 6

Fuel compositions corresponding to those of Example 5 but using 0–5 wt. % of the 50% NEODOL 91–2.5/50% NEODOL 1–3 stabilizing additive (while correspondingly varying the concentration of No. 2 diesel fuel) and containing 0.13 vol. %, 0.23 vol. %, and 0.33 vol. % water (by using ethanol having varying water concentrations) were tested to determine phase separation temperatures using ASTM D2500 and ASTM D4539. The results are shown in the figure.

The figure shows the effect of water on phase separation temperatures. Increasing water concentrations in the finally blended fuel increases phase separation temperatures of the blend at a given additive concentration. In other words, a higher solubilizing additive dosage is necessary to accommodate larger concentrations of water to achieve a particular phase separation temperature. This result substantiates the hypothesis that a higher degree of water competes for available hydrogen bounding sites against ethanol, hence requiring additional dosage of the solubilizing additive.

The foregoing description is given for clearness of understanding only, and no unnecessary limitations should be understood therefrom, as modifications within the scope of the invention may be apparent to those having ordinary skill in the art.

What is claimed is:

1. A stabilizing additive mixture comprising two different ethoxylated fatty alcohols each having a hydrocarbon chain length of about 9 to about 13 carbon atoms present in a molar ratio with respect to the other of about 1:3 to about 3:1, inclusive; 0 volume percent (vol. %) to about 10 vol. %, inclusive, based on the volume of the mixture, of a cetane booster; and 0 vol. % to less than about 5 vol. % of a demulsifier based on the volume of the mixture.

2. The stabilizing additive mixture of claim 1, wherein the ethoxylated fatty alcohols have hydrocarbon chain lengths of about 9 to about 11 carbon atoms.

3. The stabilizing additive mixture of claim 1, wherein the demulsifier is present in an amount of 0 vol. % to about 2 vol. %, inclusive, based on the volume of the mixture.

4. The stabilizing additive mixture of claim 1, wherein the cetane booster is selected from the group consisting of 2-ethylhexylnitrate, tertiary butyl peroxide, diethylene glycol methyl ether, cyclohexanol, and mixtures thereof.

5. The stabilizing additive mixture of claim 1, wherein the ethoxylated fatty alcohols have a linear, straight-chain alcohol concentration of at least about 75 weight percent, based on the total weight of the alcohols.

6. The stabilizing additive mixture of claim 5, wherein the ethoxylated fatty alcohols have a linear, straight-chain alcohol concentration of about 75 weight percent to about 85 weight percent, based on the total weight of the alcohols.

7. The stabilizing additive mixture of claim 1, wherein the ethoxylated fatty alcohols have an average molecular weight of less than about 200.

8. The stabilizing additive mixture of claim 7, wherein the ethoxylated fatty alcohols have an average molecular weight of less than about 160.

9. The stabilizing additive mixture of claim 1, wherein the ethoxylated fatty alcohols have a linear, straight-chain alcohol concentration of at least about 75 weight percent, based on the total weight of the alcohols, and an average molecular weight of less than about 200.

10. The stabilizing additive mixture of claim 9, wherein the ethoxylated fatty alcohols have an average molecular weight of less than about 160.

11. The stabilizing additive mixture of claim 9, wherein the ethoxylated fatty alcohols have a linear, straight-chain alcohol concentration of about 75 weight percent to about 85 weight percent, based on the total weight of the alcohols.

12. The stabilizing additive mixture of claim 11, wherein the ethoxylated fatty alcohols have a linear, straight-chain alcohol concentration of about 75 weight percent to about 85 weight percent, based on the total weight of the alcohols.

* * * * *